(12) United States Patent
Guo et al.

(10) Patent No.: US 7,301,734 B2
(45) Date of Patent: Nov. 27, 2007

(54) LONGITUDINAL BIAS STRUCTURE WITH IMPROVED MAGNETIC STABILITY

(75) Inventors: Yimin Guo, San Jose, CA (US);
Li-Yan Zhu, San Jose, CA (US)

(73) Assignee: Headway Technologies, Inc., Milpitas, CA (US)

( * ) Notice: Subject to any disclaimer, the term of this patent is extended or adjusted under 35 U.S.C. 154(b) by 295 days.

(21) Appl. No.: 11/210,576

(22) Filed: Aug. 24, 2005

(65) Prior Publication Data

US 2005/0280959 A1 Dec. 22, 2005

Related U.S. Application Data

(62) Division of application No. 10/394,122, filed on Mar. 21, 2003, now Pat. No. 6,944,939.

(51) Int. Cl.
*G11B 5/127* (2006.01)
*G11B 5/33* (2006.01)
*H04R 31/00* (2006.01)

(52) U.S. Cl. ............... 360/324.11; 360/324.1; 360/324.12; 360/324.2; 29/603.07; 29/603.11; 29/603.13; 29/603.14; 29/603.15; 29/603.18; 427/127; 427/128; 451/5; 451/41

(58) Field of Classification Search .. 360/324.1–324.2; 29/603.07, 603.11, 603.13–15; 427/127–128; 451/5, 41
See application file for complete search history.

(56) References Cited

U.S. PATENT DOCUMENTS

| 4,785,366 | A | | 11/1988 | Krounbi et al. ............. 360/113 |
|---|---|---|---|---|
| 5,608,593 | A | * | 3/1997 | Kim et al. ............. 360/324.12 |
| 5,634,260 | A | * | 6/1997 | Nix et al. ................ 29/603.14 |
| 5,664,316 | A | * | 9/1997 | Chen et al. .............. 29/603.08 |
| 5,712,565 | A | | 1/1998 | Schultz et al. .............. 324/252 |
| 5,713,122 | A | * | 2/1998 | Aboaf et al. ............. 29/603.08 |
| 5,739,987 | A | * | 4/1998 | Yuan et al. ............ 360/327.32 |
| 5,745,978 | A | * | 5/1998 | Aboaf et al. ............. 29/603.08 |
| 5,926,348 | A | | 7/1999 | Shouji et al. ............... 260/113 |

(Continued)

FOREIGN PATENT DOCUMENTS

EP 777214 A 6/1997

(Continued)

OTHER PUBLICATIONS

"Design, Fabrication, and Wafer Level Testing of (Ni Fe/Cu)xn Dual Stripe GMR Sensors," by Freitas et al., IEEE Trans. on Magnetics, vol. 33, No. 5, Sep. 1997, pp. 2905-2907.

*Primary Examiner*—Angel Castro
*Assistant Examiner*—Christopher R. Magee
(74) *Attorney, Agent, or Firm*—Saile Ackerman LLC; Stephen B. Ackerman

(57) ABSTRACT

A GMR sensor having improved longitudinal biasing is provided as is a method of forming it. The improved biasing is provided by longitudinal biasing structures in which a soft magnetic layer is interposed between a hard magnetic biasing layer and the lateral edge of the GMR sensor element. The soft magnetic layer eliminates the need for a seed layer directly between the hard magnetic layer and the GMR element and provides improved coupling to the free layer of the GMR element and a substantial reduction in random domain variations.

10 Claims, 2 Drawing Sheets

U.S. PATENT DOCUMENTS

| | | | |
|---|---|---|---|
| 5,943,763 A * | 8/1999 | Shouji et al. | 29/603.14 |
| 6,030,753 A | 2/2000 | Lin | 430/314 |
| 6,266,218 B1 | 7/2001 | Carey et al. | 360/324.12 |
| 6,295,186 B1 * | 9/2001 | Hasegawa et al. | 360/324.11 |
| 6,466,418 B1 * | 10/2002 | Horng et al. | 360/324.12 |
| 6,760,966 B2 * | 7/2004 | Wang et al. | 29/603.14 |
| 6,944,939 B2 * | 7/2004 | Guo et al. | 29/603.15 |
| 7,130,165 B2 * | 10/2006 | Macken et al. | 360/324.12 |

FOREIGN PATENT DOCUMENTS

JP      2001176028 A  *  6/2001

* cited by examiner

LONGITUDINAL BIAS STRUCTURE WITH IMPROVED MAGNETIC STABILITY

This is a division of patent application Ser. No. 10/394,122, filing date Mar. 21, 2003 now U.S. Pat. No. 6,944,939 A Longitudinal Bias Structure With Improved Magnetic Stability, assigned to the same assignee as the present invention, which is herein incorporated by reference in its entirety.

BACKGROUND OF THE INVENTION

1. Field of the Invention

This invention relates generally to the fabrication of a giant magnetoresistive (GMR) read head and more particularly to the improvement of the longitudinal magnetic bias of such a read head by a novel longitudinal biasing structure that interposes a soft magnetic layer between the GMR sensor element and a permanent magnet biasing layer.

2. Description of the Related Art

A giant magnetoresistive (GMR) read head requires longitudinal biasing of its free layer in order to operate in a linear readback region in as noise-free a manner as possible. The longitudinal biasing serves two complementary purposes: 1) it maintains the magnetic moment of the free layer at an optimal position (the bias point) during quiescence, so that rotations of the magnetic moment about that point during readback produce a linear response; 2) it stabilizes the domain structure of the free layer so that noise-producing domain variations (Barkhausen noise) are minimized. The longitudinal bias is generally supplied by permanent ("hard") magnetic layers, incorporated within conducting lead layers, disposed to either side of the GMR sensor element and contacting the sensor element along some shape of junction boundary. Because the permanent magnet bias layer needs to be grown on a seed layer to achieve its magnetic hardness, the seed layer is necessarily interposed between the bias layer and the GMR sensor element at the junction. This separation between the bias layer and the GMR element tends to make the edges of the GMR element less magnetically stable than its center and, therefore, the edges become a source of domain noise. One approach to minimizing this problem is the lead-overlay (LOL) design, in which the edges of the biasing layer are shunted by a layer of good conductor. However, this configuration does not solve the problem, since the conductance of the shunting layer is finite compared to the conductance of the GMR sensor structure. In addition, the LOL design does not suppress the spurious readback signal, called "side-reading," generated by the magnetic responses of the sensor edges. As the width of the sensor's active region (the "read width") decreases with the increased demands imposed by high recording density, the side-reading becomes more detrimental to the quality of the signal. Without the LOL design, however, the edges constitute a major portion of the read width of the sensor. Thus, instabilities at the edges effectively produces instabilities of the entire sensor. It has also been discovered that the instabilities increase with the increase in separation between the biasing layer and the sensor edge. This separation cannot be arbitrarily reduced, however, because (as has been noted above) of the necessity of a seed layer for the biasing layer. Making the problem even more difficult to solve is the fact that there is an appreciable scatter in the directions of magnetization among the domains in the permanent magnet forming the biasing layer. As the read width of the sensor decreases below approximately 0.15 microns, this variation in permanent magnet domain structure produces unpredictable poor biasing and, therefore, the conventional permanent magnet material may itself be unsatisfactory for use in forming biasing layers. It appears, therefore, that a novel approach is needed to provide effective longitudinal biasing of a GMR sensor having a very narrow read width.

There is ample prior art that teaches the formation of stable longitudinal bias. Krounbi et al. (U.S. Pat. No. 4,785,366) teaches the covering of an entire magnetoresistive (MR) sensor by a layer of soft magnetic material over which there is formed an antiferromagnetic layer which couples to the soft layer by exchange coupling. The coupling provides logitudinal biasing at the passive lateral edges of the sensor and transverse biasing in the active readwidth region.

Schultz et al. (U.S. Pat. No. 5,712,565) teaches the formation of an MR sensor elements having permanent magnetic longitudinal biasing layers over which are formed current leads with slanted contacts. The provided configuration advantageously direct current in a manner that avoids the passage of current through the permanent magnetic material.

Shouji et al. (U.S. Pat. No. 5,926,348) teaches the formation of an MR head having a longitudinal biasing layer with a central flat portion and slanted portions laterally disposed about the flat portion. The MR element is positioned within the cavity formed by the biasing layer, whereby the slanted portions of the biasing layer provide the necessary domain stabilization to the MR element.

Lin (U.S. Pat. No. 6,030,753) teaches the formation of a longitudinally biased MR or GMR sensor by forming the longitudinal biasing layer as a continuous layer overlaying the entire sensor element, then forming a continuous conducting lead layer over the biasing layer and, finally, etching through a central portion to define an active readwidth.

Carey et al. (U.S. Pat. No. 6,266,218) teaches a longitudinal biasing layer formed as an antiferromagnetically coupled pair of ferromagnetic layers. The resulting layer is an effective biasing layer yet has a low product of thickness and magnetization.

Hasegawa et al. (U.S. Pat. No. 6,295,186) teach the formation of a spin valve structure in which an antiferromagnetic layer is used to provide a longitudinal bias to a ferromagnetic free layer and another antiferromagnetic layer forms a coercive force increasing layer to pin a ferromagnetic pinned layer with its magnetization in a transverse direction.

The inventions briefly described above do not address the problem associated with the inadequacy of hard magnetic layers to adequately bias a GMR sensor of extremely narrow trackwidth. Indeed many the cited inventions are quite similar to the LOL configuration which suffers from shortcomings also discussed above. None of the inventions teach a method of using hard magnetic layers for longitudinal biasing while still retaining the ability to fabricate a very narrow read width.

SUMMARY OF THE INVENTION

Accordingly, it is a first object of the present invention to provide a GMR sensor with an ultra-narrow (<0.15 microns) read width and a longitudinally biased free layer having high magnetic stability.

It is a second object of the present invention to form such a sensor using an existing abutted junction configuration that is easily and efficiently fabricated and that avoids the unwanted side reading of the LOL design.

It is a third object of the present invention to provide such a sensor without the necessity of utilizing such a strong degree of longitudinal bias that the reaction of the free layer is impeded and a low readback amplitude results.

The above objects are achieved by interposing a layer of soft magnetic material (eg., ferromagnetic material, as in the free layer) between the hard biasing layer and the side junctions of the GMR sensor element. No seed layer is required to form this insert. This "SM insert" may be optionally covered by a layer of high conductance to reduce its overall resistance. The soft magnetic insert so formed improves the magnetic coupling between the hard magnetic biasing layer and the soft magnetic free layer by eliminating the necessity of forming a seed layer directly against the GMR sensor. In the present invention, the seed layer is formed over the larger junction area of the insert, providing better coupling with the hard magnetic biasing layer. The insert, in turn, provides better coupling to the free layer in the GMR sensor. As a result, the effect on the free layer of domain scatter in hard magnetic layers is avoided and the stability of the free layer is significantly improved. In addition, the bias weakening due to the separation (by the seed layer) of the hard bias layer from the free layer is also avoided and it is not necessary to use an overly strong biasing magnetic layer to obtain the same degree of biasing. Although the LOL design can also be viewed as interposing conducting material between the biasing layer and the active region of the sensor, in the LOL design the conducting material is the lateral edges of the GMR element itself. Thus, these edges remain operative to some extent and produce the unwanted side reading of the LOL design. In the abutted junction of the present invention, no portion of the GMR sensor element remains beyond the active region and the SM inserts are passive elements that do not produce side reading. In addition, because the SM inserts are thicker than the free layer, they transmit the magnetic field of the hard biasing layer across the abutted junction more effectively than the free layer itself when it is used in the LOL design.

The ease of fabrication of the sensor can be inferred from the following brief description:

1) Deposit a GMR sensor strip (a laminate comprising a sensor) on a provided wafer substrate.
2) Define the top of the GMR element using an IBE (ion beam etch) and a first mask.
3) Using the first mask, form a pair of soft magnetic inserts abutted against the GMR element. No seed layer is required.
4) Using the same first mask, form a self-aligned conducting layer over the inserts.
5) Using a second mask, trim the inserts and layer and form permanent magnet bias layers abutted against the GMR strip and inserts. A seed layer is first formed over the soft magnetic inserts.
6) Using the second mask form conducting leads over the bias layers.

Although these 6 steps are for schematic purposes only, they serve to indicate the basic simplicity of the method. The steps will be elaborated upon in the description of the preferred embodiment that follows.

BRIEF DESCRIPTION OF THE DRAWINGS

The objects, features and advantages of the present invention are understood within the context of the Description of the Preferred Embodiments, as set forth below. The Description of the Preferred Embodiments is understood within the context of the accompanying figures, wherein.

DESCRIPTION OF THE PREFERRED EMBODIMENT

A preferred embodiment of the present invention provides a GMR read head with a longitudinal biasing structure of improved magnetic stability and a method of forming it.

Figure 1A:
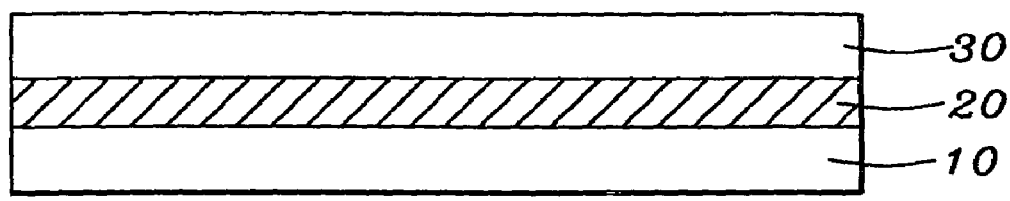
FIGS. 1a-d are a series of schematic cross-sectional views through the air-bearing surface (ABS) plane of the GMR sensor of the present invention showing the steps in its fabrication.

Referring first to FIG. 1a, there is seen a schematic cross-sectional view of a partially fabricated read head taken through its ABS plane. There is seen a substrate which is a bottom shield layer (10), which may be an upper shield of a magnetic write head formed below the read head. On this substrate is then formed an insulating gap layer (20), which may be a layer of insulating material such as alumina, formed to a thickness between approximately 50 and 300 angstroms. On the gap layer is then formed a GMR structure (30), which is a laminate of layers which, when patterned, will form a GMR sensor element. This element may be any of several types of GMR sensor configurations, including, among others, top or bottom spin valves, all including a ferromagnetic free layer requiring longitudinal biasing.

Figure 1B:
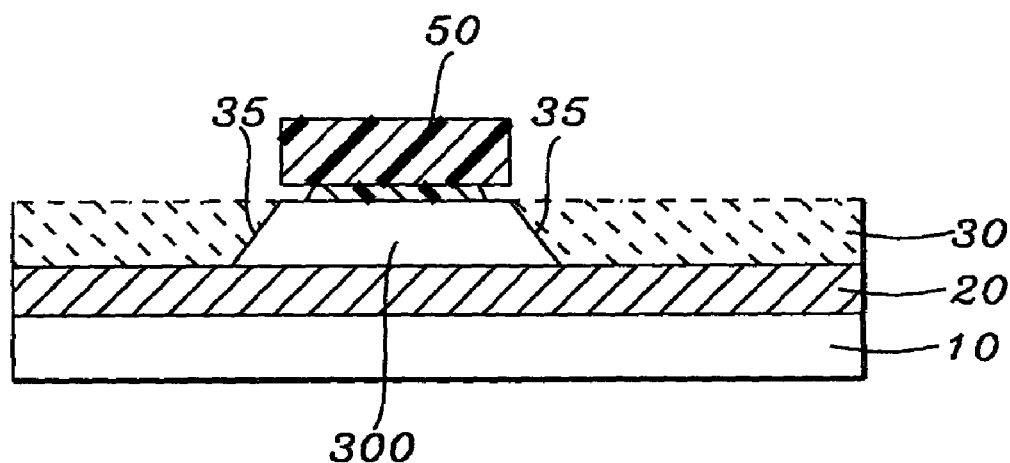

Referring next to FIG. 1b, there is shown the remaining portion of the GMR structure (300), after shaping, using first photoresist mask (50), by a method such as ion beam etching (IBE) to remove laterally disposed portions (shown shaded) and to form lateral edges (35) suitable for the formation of abutted junctions. The width of the remaining portion of the GMR structure (300) defines the active readwidth for the GMR sensor element in the completed read head. As has been noted above, the width of the GMR sensor element can be 0.15 microns and below and the advantages of the improved biasing will be obtained.

Figure 1C:
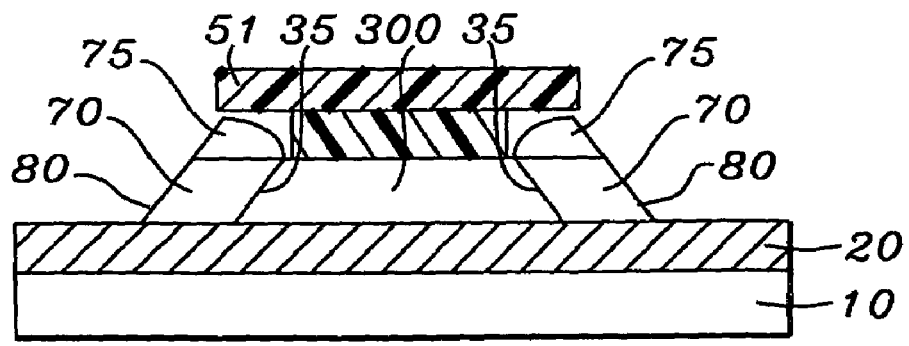

Referring next to FIG. 1c, there is shown the formation of the novel longitudinal biasing structures of the present invention. When completely formed, these structures will comprise two portions, a hard magnetic portion and a soft magnetic portion. The formation proceeds first with the formation of soft magnetic inserts (SM inserts) (70) against the lateral edges of the GMR sensor element (35) to form abutted junctions. No seed layer is required on which to form these inserts and they are formed of ferromagnetic material, such as NiFe, deposited to a thickness between approximately 30 and 200 angstroms and having a lateral width between approximately 100 and 2000 angstroms using the first photoresist mask ((50) of FIG. 1b) as a deposition mask (not shown in this figure). It is particularly advantageous to form the inserts so that their top surface is coplanar with the top surface of the GMR sensor element. Optionally, layers of a good conductor (75) can be formed over the inserts to reduce their resistance. If included, the conductor is formed using the same first deposition mask and, in this preferred embodiment, is a laminate of Ta/Au/Ta, formed to a thickness between approximately 100 and 500 angstroms. The SM insert and the conducting layer are shown in the figure after using a second mask (51) for trimming them to form junctions (80) against which the permanent magnet biasing layers and conducting lead layers will be formed.

Figure 1D:
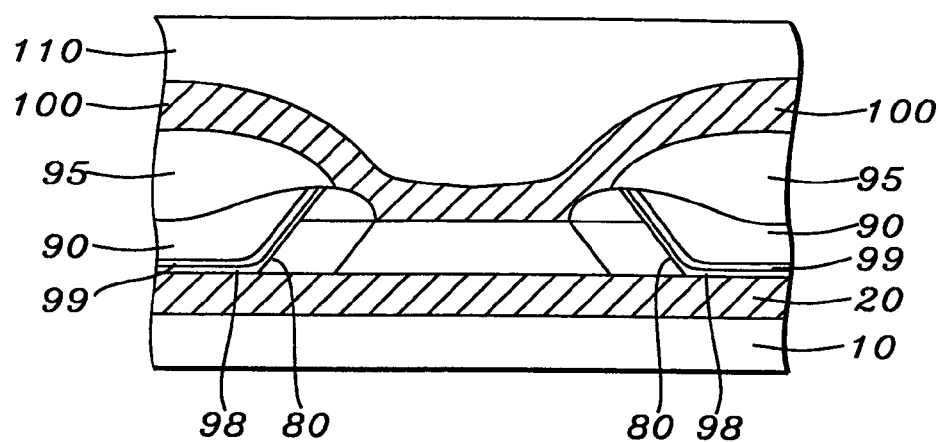

Referring next to FIG. 1*d*, there is shown the hard magnetic portion of the biasing structure (90), and a conducting lead layer (95) formed over it, using the second trimming mask as a deposition mask ((51) of FIG. 1*c*). A seed layer (99), such as a layer of Cr or CrX, where X is chosen from the group consisting of Ti, W, Mo, V, Mn and TiW, is first formed to a thickness between approximately 25 and 200 angstroms on a Ta underlayer (98) which is formed to a thickness between approximately 10 and 50 angstroms, the combined seed layer and underlayer being formed between the surfaces of the biasing layer (90) and the junctions (80) to allow the biasing layer to be formed with maximal magnetic uniformity and quality. In this preferred embodiment, the biasing layer is a layer of the permanent magnetic material CoY, where Y is chosen from the group consisting of CrPt, Pt and CrTa alloy and is formed to a thickness between approximately 50 and 300 angstroms. Alternatively, the permanent magnet biasing layer can be replaced by a layer of NiFe, formed to a thickness between approximately 50 and 300 angstroms, which is pinned magnetically by exchange coupling with a layer of antiferromagnetic material (AFM) such as PtMn, NiMn, IrMn or CrPtMn. The biasing layer can also be replaced by such an antiferromagnetic layer that is exchange coupled to the SM insert, or it can be replaced by a synthetic antiferromagnetic layer that is similarly pinned by exchange coupling. In any of the above configurations, the SM insert will achieve the desired objects of the invention. The conducting lead layer (95) is a layer of Ta/Au/Ta formed to a thickness between approximately 50 and 1000 angstroms.

Still referring to FIG. 1*d*, there is shown the additional formation of a blanketing insulating gap layer (100) covering all exposed upper surfaces and which may be a layer of alumina formed to a thickness between approximately 50 and 300 angstroms. An upper shield layer (110) is then formed over the gap layer to complete the fabrication.

Figure 2:
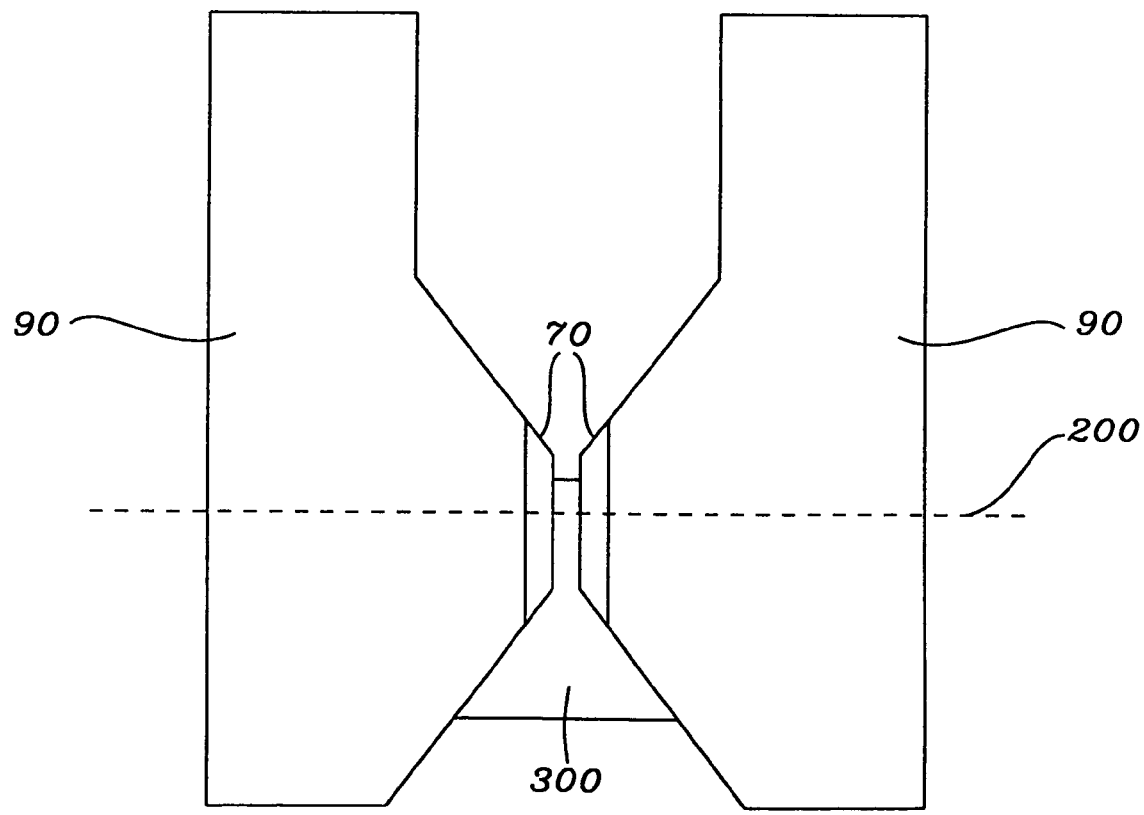
FIG. 2 is a schematic planar cross-sectional view (through a lateral plane perpendicular to the ABS plane) of the completed GMR sensor, showing the inserts and the abutted leads, prior to slicing through the ABS plane in a later processing step.

Referring next to FIG. 2, there is shown a schematic horizontal planar cross-sectional view of the fabrication in FIG. 1*e*, with the cross-section taken through the plane of the GMR sensor. There can be seen the sensor (300), the SM inserts (70) and the conducting lead layers (90) (it being understood that the plane of the figure would intersect either the lead or the biasing layer). A dashed line (200) indicates the ABS plane at which the sensor fabrication would be cut during subsequent processing.

As is understood by a person skilled in the art, the preferred embodiment of the present invention is illustrative of the present invention rather than limiting of the present invention. Revisions and modifications may be made to methods, materials, structures and dimensions employed in the present method of fabricating a GMR sensor with improved longitudinal biasing and the sensor so fabricated, while still providing a method of fabricating a GMR sensor with improved longitudinal biasing and the sensor so fabricated, in accord with the spirit and scope of the present invention as defined by the appended claims.

What is claimed is:

1. A GMR sensor having improved longitudinal biasing comprising:
   a substrate;
   a first insulating layer formed on said substrate;
   a GMR sensor element formed on said first insulating layer, said element comprising a layered GMR structure including a ferromagnetic free layer, said structure having a substantially planar upper surface and a read-width defined by lateral planar edges;
   two longitudinal biasing structures, laterally disposed to either side of said GMR sensor element and abutting said lateral planar edges, each said biasing structure further comprising:
   a soft magnetic layer having a first lateral edge contiguous with and abutting the lateral edge of said GMR sensor element, said layer extending laterally outward from said sensor element lateral edge and being trimmed to form a substantially planar second lateral edge;
   a hard magnetic layer abutting said soft magnetic layer at said layer's second lateral edge and substantially covering said second lateral edge;
   a conducting lead layer formed over each hard magnetic layer;
   a second insulating layer formed over all exposed surfaces of said conducting lead layer, said conducting layer and said GMR sensor element.

2. The sensor of claim 1 wherein the upper surface of said soft magnetic portion is a planar surface and is substantially coplanar with said upper surface of said GMR sensor element.

3. The sensor of claim 1 wherein each of said longitudinal biasing structures also includes a conducting layer formed on the upper surface of said soft magnetic portion which substantially covers said upper surface, said conducting layer having a lateral edge coplanar with the second lateral edge of the soft magnetic portion and wherein said permanent magnetic portion abuts both said soft magnetic portion and said conducting layer.

4. The sensor of claim 1 wherein said soft magnetic layer is formed of the same soft magnetic material as forms the free layer of the GMR sensor element.

5. The sensor of claim 1 wherein said conducting layer formed on the upper surface of said soft magnetic layer and said conducting lead layer are both formed of a Ta/Au/Ta laminated layer.

6. The sensor of claim 5 wherein the Ta/Au/Ta laminated layer formed on the upper surface of said soft magnetic layer is formed to a thickness between approximately 100 and 500 angstroms.

7. The sensor of claim 1 wherein said soft magnetic layer is a layer of NiFe formed to a thickness between approximately 30 and 200 angstroms and having a width between approximately 100 and 2000 angstroms.

8. The sensor of claim 1 wherein said hard magnetic layer comprises a layer of CoPt, CoCrPt, CoCrTa or other Co alloy, said layer being formed to a thickness between approximately 50 and 300 angstroms on a double layer which further comprises a seed layer formed of CrTi, CrW, CrMo, CrV, CrMn or TiW, formed on an underlayer of Ta, wherein said seed layer is formed to a thickness of between approximately 25 and 200 angstroms and said underlayer is formed to a thickness between 10 and 50 angstroms.

9. The sensor of claim 1 wherein said hard magnetic layer is a layer of NiFe formed to a thickness between approximately 50 and 300 angstroms and pinned magnetically by exchange coupling with an antiferromagnetic layer of PtMn, NiMn, IrMn or CrPtMn.

10. The sensor of claim 1 wherein said hard magnetic layer is a synthetic antiferromagnetic layer pinned by exchange coupling with an antiferromagnetic layer.

* * * * *